(12) United States Patent
Wu et al.

(10) Patent No.: US 12,477,164 B1
(45) Date of Patent: Nov. 18, 2025

(54) COST AND EFFICIENCY OPTIMIZATION IN CHANNEL PLAYOUT

(71) Applicant: Amazon Technologies, Inc., Seattle, WA (US)

(72) Inventors: Yongjun Wu, Bellevue, WA (US); Vitaly Panor, Maple (CA); Abhishek Trivedi, Brampton (CA); Saumil Patel, Brampton (CA); Ravindra Ganti, Sammamish, WA (US); John F.X. Gaquin, Lynnwood, WA (US); Ho Yin Ng, Milton (CA); Joohoon Kim, Thornhill (CA); Shazia Khan, London (GB); Benjamin Raphael Forman, Watford (GB)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 18/342,626

(22) Filed: Jun. 27, 2023

(51) Int. Cl.
*H04N 21/262* (2011.01)
*H04N 21/2665* (2011.01)

(52) U.S. Cl.
CPC ... *H04N 21/26233* (2013.01); *H04N 21/2665* (2013.01)

(58) Field of Classification Search
None
See application file for complete search history.

(56) References Cited

U.S. PATENT DOCUMENTS

| | | | |
|---|---|---|---|
| 5,895,121 A * | 4/1999 | Grey | G11B 27/002 386/314 |
| 9,973,785 B1 * | 5/2018 | Yang | H04N 21/8352 |
| 10,045,053 B1 * | 8/2018 | Wu | H04N 21/25808 |
| 10,114,689 B1 * | 10/2018 | Yang | G06F 11/0751 |
| 2010/0293190 A1 * | 11/2010 | Kaiser | H04N 21/854 707/769 |
| 2011/0119394 A1 * | 5/2011 | Wang | H04L 65/65 709/231 |
| 2011/0145856 A1 * | 6/2011 | Agarwal | H04N 21/25435 725/32 |
| 2014/0331266 A1 * | 11/2014 | Harrison | H04N 21/85406 725/98 |
| 2015/0100702 A1 * | 4/2015 | Krishna | H04L 65/75 709/231 |
| 2015/0256600 A1 * | 9/2015 | Dakhane | H04L 65/60 709/203 |
| 2015/0334434 A1 * | 11/2015 | Green | H04N 21/2665 725/34 |
| 2016/0029051 A1 * | 1/2016 | Manzari | H04L 67/02 725/36 |
| 2016/0366617 A1 * | 12/2016 | Chen | H04W 28/14 |
| 2017/0013296 A1 * | 1/2017 | Millar | H04N 21/6408 |
| 2017/0332114 A1 * | 11/2017 | Turgut | H04N 21/482 |

FOREIGN PATENT DOCUMENTS

WO WO-2016089425 A1 * 6/2016 ......... H04N 21/2187

* cited by examiner

*Primary Examiner* — William J Kim
(74) *Attorney, Agent, or Firm* — Weaver Austin Villeneuve & Sampson LLP

(57) ABSTRACT

Linear playout provides media content according to a schedule. Live events and video on demand (VOD) assets may be provided as part of linear playout. The linear playout process may be optimized to improve quality of experience for users and decrease the costs in providing such content.

18 Claims, 4 Drawing Sheets

COST AND EFFICIENCY OPTIMIZATION IN CHANNEL PLAYOUT

BACKGROUND

Video content may be provided through a number of media, such as television and the Internet. Linear channels of video content may be streamed in real time by providing manifests according to a schedule. User devices may select a channel and receive a manifest having references to the scheduled video content.

DETAILED DESCRIPTION

Figure 1:
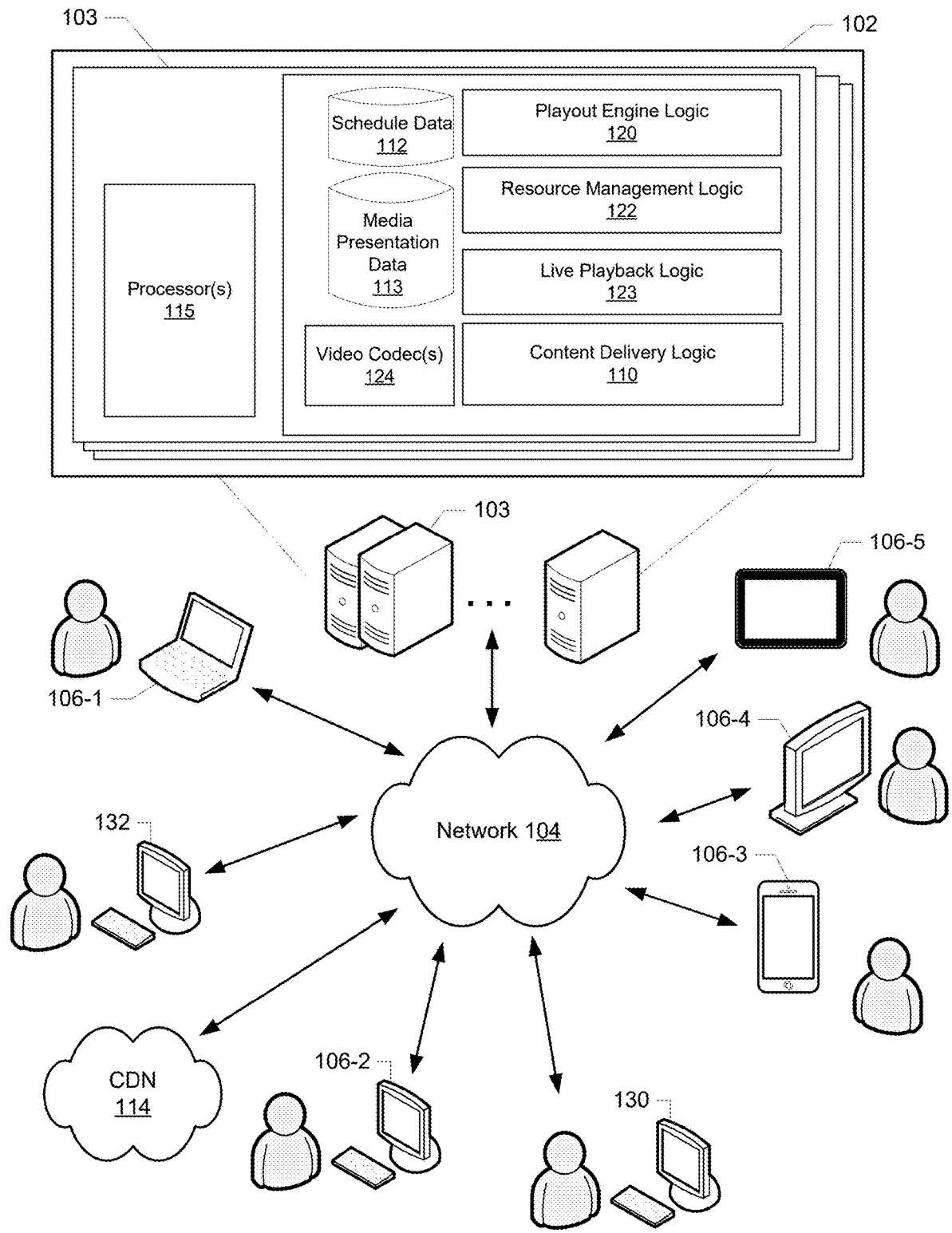
FIG. 1 illustrates an example of a computing environment for streaming media content.

This disclosure relates to techniques for over the top (OTT) linear station playout using video on demand (VOD) assets. In the context of broadcasting and media production, "playout" refers to the process of delivering pre-recorded or live content to an audience. During playout, media content, such as live events, movies, or advertisements, is provided to playback devices through various distribution channels, including television networks and streaming platforms. Playout can involve both traditional broadcast methods and OTT digital delivery mechanisms. Linear playout refers to continuous delivery of scheduled content, typically via a plurality of channels or stations from which a user device may select.

A linear playout process for OTT station streaming may include scheduling, preparation, and provision of content for playback. Linear channels or stations may be scheduled, determining the content to be played on a station for a specific duration, e.g., a week or a month. The content may then be prepared, e.g., encoded, packaged, encrypted, etc. Finally, a live manifest may be provided to user devices, allowing user devices to request content for a specific station and begin playback of content according to the schedule for that station.

OTT linear station playout may typically be performed as if the content to be streamed is of a live event, even if the content is a VOD asset. Live event media streaming includes generating fragments and manifests in real time to be provided to a client device for playback. For OTT linear playout, treating VOD content as a live event stream enables user devices to join a station and request fragments according to a pre-determined schedule, similar to how a user device may join a live event and commence playback at the live head.

Live event streaming may be distinguished from typical VOD streaming. Live event streaming provides a live manifest that contains references for content at the live head of the stream. These references may be treated as a sliding window, where updated manifest data is provided to add new references and remove old references. When streaming a live event, the new references are the most recently encoded fragments. However, when live streaming VOD content the new references may be based on an associated schedule that determines when portions of VOD content are provided to client devices as well as where to insert secondary content, e.g., advertisements. Old references, e.g., references to content that should have been played back at a prior time from the live head, may expire or be removed from the live manifest to reduce the live manifest file size and inhibit client devices from requesting previously streamed content.

VOD streaming, in contrast to live event streaming, may provide clients a manifest that allows clients to begin playback at various portions of VOD content. For example, trick modes, e.g., rewind and fast forward, may be enabled and allow viewers to select any portion of the VOD content for playback. As the manifest contains references to the entire VOD content, a user may select any portion of the VOD content for playback at any time rather than playback adhering to a predetermined schedule. However, these functions may be limited when streaming VOD content as a live stream.

Streaming linear playout content as a live event has several advantages. First, live events and linear playout both follow a schedule. For example, a live sports event, such as a football game, will have kick-off at a designated time. Linear playout, similarly, has a schedule that plays particular content, e.g., live event content or VOD content, at a designated time. Second, a manifest for live events may employ a sliding window that is updated and has a live head for the latest encoded fragment. In a live sporting event, the latest encoded fragment is encoded in real time relative to the content to be watched. For linear playout the live head may reference the scheduled fragment to be played back, whether that fragment is of a live event (and thus newly encoded in real time) or VOD content (and thus may be encoded far in advance of playback). Third, manifests for live events may have metadata such as timing information that is synchronized to a universal clock for simultaneous playback across different client devices. It is similarly desirable for simultaneous playback of content across devices for linear playout. In some implementations, both live event streaming and linear playout may allow for rewind or playback from a time prior to the live head, e.g., less than about one hour. This may allow people to catch up on content from the beginning if they begin playback after the start time of a program.

While OTT linear station playout content may be streamed as live events, the underlying content may include VOD assets. VOD content, such as movies or television shows, are pre-recorded and are not constrained by the real time requirements of live event streaming. For example, minimizing latency from encoding and transmitting content is a highly relevant metric for quality of experience (QoE) when streaming a live sporting event to minimize lag between the real time event and playback of content showing that event. In contrast, a VOD asset, such as a movie, does not have such latency constraints as it may be encoded prior to any requests for playback. Thus, OTT linear station playout, while similar to live event streaming, may be performed differently when VOD content is included in a schedule of programs.

FIG. 1 illustrates an example of a computing environment in which a video content service 102 provides streaming content for linear playout (e.g., video and/or audio) via network 104 to a variety of client devices (106-1 through 106-5) in accordance with the techniques described herein. In various implementations, the streaming content may be a media presentation of VOD assets or a live event (e.g., a livestream, broadcast, and/or camera feed of an ongoing live event and/or a recording of a partially or fully-completed event which may also be referred to as formerly-live event). Content service 102 may conform to any of a wide variety of architectures such as, for example, a services platform deployed at one or more co-locations, each implemented with one or more servers 103. Servers 103 can include one or more processors 115, memory, and other hardware for performing the tasks disclosed herein. Network 104 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 106 may be any suitable device capable of connecting to network 104 and consuming streaming content provided by service 102. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices, etc.

Content service 102 may encode (using video codecs 124) VOD assets or captured video of a live event for delivery as a plurality of linear playouts that include different quality-level and bitrate versions of the content, delivered according to a number of streaming protocols including, for example, HTTP Live Streaming (HLS), Dynamic Adaptive Streaming over HTTP (DASH), Sye streaming, and Smooth Streaming. Linear playout clients (e.g., device 106-1) consume the linear playout content using live manifests that are periodically made available by content service 102 as additional content is encoded, packaged, and/or added to the manifest. Fragments of content are then delivered over network 104.

At least some of the examples described herein contemplate implementations based on computing models that enable ubiquitous, convenient, on-demand network access to a shared pool of computing resources (e.g., networks, servers, storage, applications, and services) to provide streaming content. As will be understood, such computing resources may be integrated with and/or under the control of the same entity, e.g., the entity controlling content service 102. Alternatively, such resources may be independent of content service 102, e.g., on a platform under control of a separate provider of computing resources with which content service 102 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular streaming protocols herein are merely by way of example. Suitable alternatives known to those of skill in the art may be employed.

In the following examples and for the sake of simplicity, content service 102 is described as if it is integrated with or includes the platform(s) that provides media presentations to client devices. However, it will be understood that content service 102 may provide access to media presentations content in conjunction with one or more content delivery networks (e.g., CDN 114) that may or may not be independent of content service 102. In addition, the source(s) of one or both of the primary content and the replacement content may be independent of or integrated to various degrees with content service 102. Implementations are contemplated in which content may be stitched and/or encoded, and/or metadata manipulated by a service that is integrated with a content service (e.g., 102), by a service associated with the content provider, or as a third-party service. The range of variations known to those of skill in the art are contemplated to be within the scope of this disclosure.

Implementations enabled by the present disclosure contemplate logic resident on the client devices consuming video content from content service 102. Client devices may have logic to request alternative audio streams or overlays. Such logic might be part of an existing algorithm or module on the client device or implemented to work in conjunction with such an algorithm or module.

Content service 102 includes content delivery logic 110 that facilitates at least some aspects of content delivery to client devices 106. In some implementations, content delivery logic 110 facilitates providing segments of a live event or VOD content, including video segments and audio segments. Content service 102 may also include playout engine logic 120. Playout engine logic 120 facilitates generating live manifests that a client device may use to request content for playback. Content service 102 may further include resource management logic 122. Resource management logic 122 may prepare assets for playback, including encoding, packaging, and encryption as well as manage and validate schedules describing the content to be included in the linear playout. Content service 102 may also include live playback logic 123. Live playback logic may route requests from client devices for manifests and content segments, as well as insert secondary content.

Content service 102 may also include a variety of information related to. Schedule data 112 and media presentation data 113. Schedule data 112 may comprise information about schedules for each channel, including past, current, and upcoming schedules for a channel. Media presentation data 113 may include media assets, e.g., raw mp4 VOD assets as well as encoded and packaged content. Media presentation 113 may also include ad slates that may be included in a manifest, which may be replaced by dynamically inserted ad content prior to providing the manifest to a client device. Content service 102 can also further include one or more video codecs 124, which may be used to encode media presentations at one or more quality levels that are stored in data store 113. Information may include the schedules, manifests, and associated metadata in data stores 112 and 113 to which service 102 provides access. Alternatively, such information associated with and/or about the content, as well as the content itself may be provided and/or hosted by one or more separate platforms, e.g., CDN 114 or remote cloud storage. It should be noted that, while logic 110, 120, 122, and 123, and data stores 112 and 113 are shown as integrated with content service 102, implementations are contemplated in which some or all of these operate remotely from the associated content service, and/or are under the control of an independent or more loosely integrated entity. From these examples, those of skill in the art will understand the diversity of use cases to which the techniques described herein are applicable.

Figure 2:
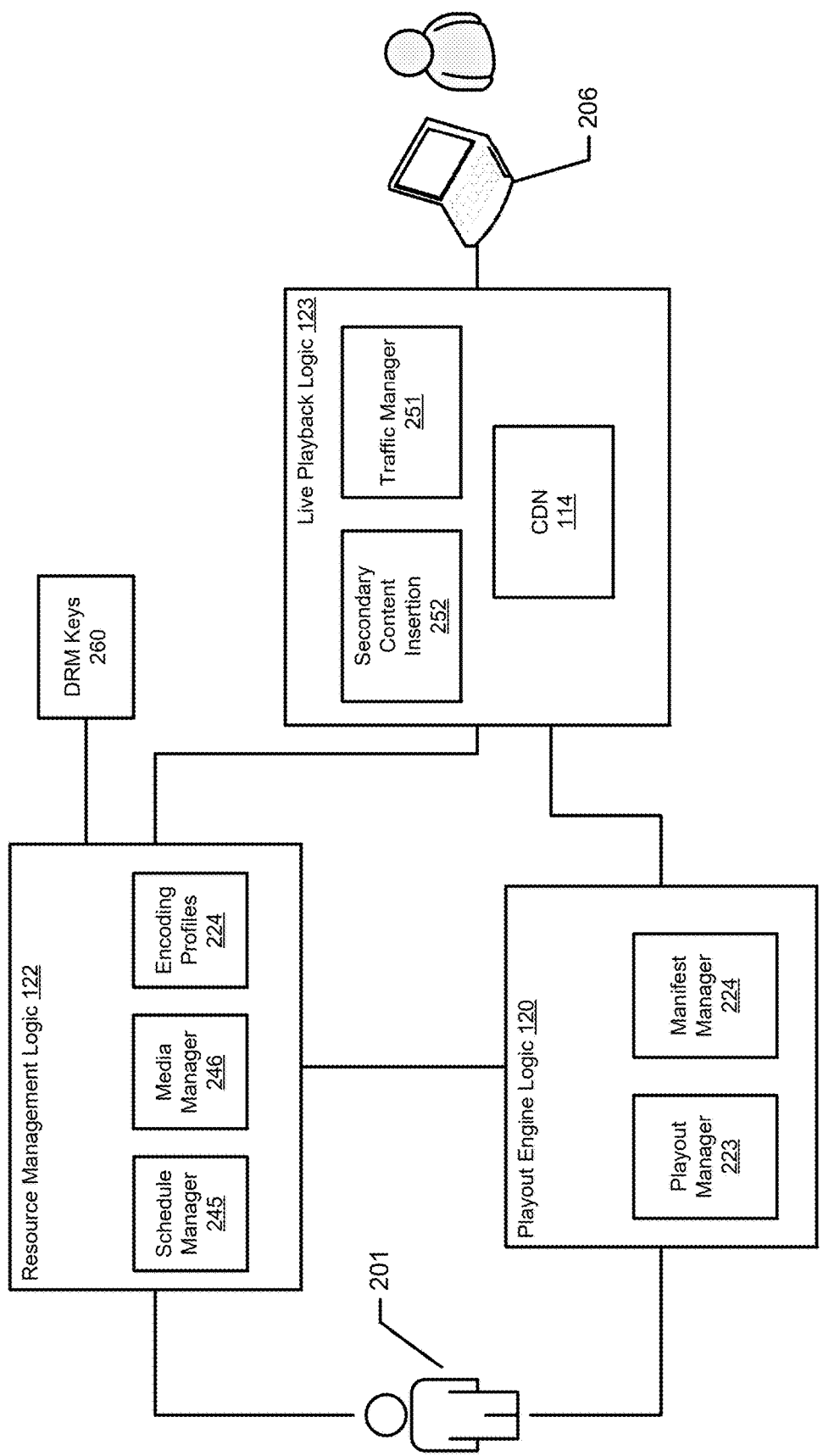
FIG. 2 illustrates a system architecture for linear playout of live and VOD content.

FIG. 2 presents an architecture of various logic and systems for preparation and execution of linear playout. The architecture of FIG. 2 may be understood by reference to the flowcharts of FIGS. 3 and 4, which disclose how a channel may be initiated and how to playback scheduled content. Playout engine logic 120 may comprise a playout manager 223 and a manifest manager 224. Playout manager 223 may manage channels, including whether channels are active or stopped and initializing an ID for new channels after receiving a request to create a new channel from a channel creator 201. Manifest manager 224 may stitch manifests together according to various live streaming protocols, e.g., HLS or DASH, which may be provided to client devices for live streaming of linear playout content. In some implementations, manifest manager 224 may perform just-in-time stitching of live manifests in response to a request from a client device. Upon receiving a request for a live manifest for a channel, manifest manager 224 may request a portion of the corresponding schedule for the channel, identify content to be currently streamed according to the schedule, retrieve a manifest for that content, and integrate references to that content into a live manifest. The live manifest may thus have references to content that are synchronized with the associated schedule.

Resource management logic 122 may also receive a schedule from creator 201 that is stored and managed by schedule manager 245. In some implementations, a schedule may contain a list of programs and secondary content placements. Each program may refer to VOD content or live events that will be available for playback as part of the channel. Each program may also be associated with a start time and end time, as well as cue points within the program in which to insert secondary content. Secondary content placement, e.g., advertisements, may occur between and within programs. In some implementations secondary content may be defined by a start time and duration. In some implementations, specific secondary content may be inserted, e.g., ad slates, while in other implementations the secondary content may be a marker that is replaced with dynamically inserted advertisements.

The list of programs, secondary content placements, and their respective start and end times defines a continuous linear stream of content available for playback as part of the associated channel. In some implementations a schedule may loop, wherein the schedule defines a linear stream of content to be played back for a week, two weeks, a month, etc., and at the end of the linear stream the schedule restarts at the beginning. In other embodiments, a second schedule may be implemented following the end of the first schedule, the second schedule having a second set of programs and secondary content placements.

Resource management logic 122 may also receive assets for a channel, including VOD assets and live event assets. In some implementations, such assets are received from a channel creator, while in other embodiments media presentation assets may already be stored. Media manager 246 may store information about media presentation assets, including raw asset files, encoded and/or packaged assets, and the encryption of assets. Media manager may also manage encoding of VOD assets prior to providing portions of VOD content for playback.

In some implementations, a single VOD asset may be used for multiple channels. Multiple channels may have schedules that include the same VOD asset. Maintaining a distinct copy of the VOD asset for each channel may unnecessarily increase cost due to duplicative storage and encoding. Thus, the VOD asset may be encoded and packaged once, and then used for playback in multiple channels.

In some implementation, a VOD asset may be stored as a single file having segments defined by byte-ranges that may be included in a live manifest. Live streaming typically may use individual segment files as each file is being encoded and generated in real time to a live event. However, when live streaming a VOD asset the VOD asset may already be encoded. This facilitates combining individual encoded segments into a single file and referencing segments using a byte-range of that file. A live manifest stitched and provided to a client may include byte-range references to the VOD content, which a client may then use to request segments. Traffic manager 251 may receive requests to byte-ranges of the VOD content, in response to which media manager 246 may provide the corresponding segment of content.

In some implementations, a VOD asset may be encoded and packaged according to a set of cue points for secondary content insertion. Cue points may refer to specific markers or timestamps in a VOD asset where secondary content may be inserted during playback. In some implementations a cue point may be a SCTE marker or a similar marker. These cue points may act as triggers for ad insertion. In some implementations, cue points enable server-side ad insertion schemes where a dynamic ad insertion service may identify cue points in a manifest and insert advertisements based on the cue points. Alternatively, cue points may be used for client-side ad insertion by triggering a client device to request ad content for playback. Cue points may also include various metadata, e.g., type of secondary content to insert, duration of the secondary content, targeting criteria, etc.

In some implementations, different channel creators may prefer different cue points for the same underlying VOD asset. The various cue points may be combined into a single set that the VOD asset may be encoded in accordance with. For example, a portion of VOD content may be encoded so that segments start/end at cue points to enable seamless integration of the secondary content. Then, during generation of a live manifest a subset of cue points may be included in the live manifest based on the cue points noted in the schedule corresponding to the live manifest. Thus, a single VOD asset may be maintained by encoding VOD assets based on the superset of cue points for various channels, reducing costs associated with storage and delivery of the VOD content. In some implementations, a single VOD asset may be encoded to have segments that start/end at each of the cue points. A live manifest may then include references to segments including some of the cue points but not including other cue points of the superset of cue points.

In some implementations, the VOD asset may be encrypted for storage, and re-encrypted/transcrypted for each channel based on DRM keys 260. In some implementations, each channel may use a distinct encryption key for encrypting content provided to client devices as part of that channel. For example, a VOD asset may be encoded and packaged once for multiple channels. Then, prior to providing portions of the VOD content for playback as part of a linear playout, the portions may be re-encrypted based on the encryption key for that linear playout. Thus, a single VOD asset may be used for providing portions of VOD content for playback across channels, but the VOD content has a different encryption key for each channel. In some implementations re-encryption/transcription may be performed in real time for each channel. In some implementations re-encryption/transcription may be performed prior to a channel being available for client devices to request and a separate copy for each channel is stored.

In some implementations, a manifest associated with the VOD content may be re-used for generating a live manifest while VOD content is re-encrypted/transcrypted. In some embodiments, when generating a live manifest, manifest manager 224 may request a VOD manifest associated with the VOD content that defines each portion of the VOD content that may be provided for playback, e.g., as individual segments or byte-range references. The live manifest may use the references in the VOD manifest and modify the references to include additional information, e.g., timing information on when the portions of VOD content should be played back according to an associated schedule. In some implementations, a VOD manifest may be used for generating a live manifest when re-encrypting the VOD content.

In some implementations, the contents of the VOD manifest may be altered prior to inclusion in a live manifest. For example, some packaging protocols may include emulation prevention bytes. Emulation prevention bytes may be used to replace bit-patterns in a packet that contain a start code that may cause a decoder to fail. Start codes indicate the start of a video packet or frame, however, encrypted content may include start codes as a result of applying the encryption. By replacing these emulated start codes with an emulation prevention byte, a decoder may identify the proper start codes. Re-encryption/transcription may cause different portions of the encrypted content to have an emulated start code, and thus require different emulation prevention bytes, which can affect how the content is referenced in a manifest. Thus, in some embodiments, the live manifest may be generated based upon the VOD manifest and the VOD content encrypted using an encryption key associated with the channel corresponding to the live manifest.

In some implementations, VOD content may be encoded according to one or more of encoding profiles 224. In some implementations, VOD content may be encoded according to a quality-defined variable bitrate (QVBR) control algorithm. There are various encoding algorithms, including constant bitrate (CBR) encoding and QVBR encoding. A CBR encoding maintains a fixed bitrate throughout the duration of encoded content. A QVBR encoding, by contrast, may vary the bitrate based on the complexity of the content, allocating additional bits to complex scenes that are difficult to compress while allocating fewer bits to relatively simpler scenes that can be encoded with fewer bits. The result is an encoding that maintains a similar quality level across scenes despite varying complexity. As QVBR performs additional analysis of content, e.g., analysis of frames and blocks within frames, to determine where to allocate additional bits, a QVBR encoding algorithm typically requires additional computation time to output an encoded segment compared to a CBR algorithm.

In some implementations, during a live stream a QVBR algorithm may increase latency between the real time event and playback of the live event beyond an acceptable threshold. VOD content, however, may be completely encoded prior to any playback of the VOD content. The additional computation time of a QVBR algorithm does not negatively impact quality of experience for users live streaming VOD content, compared to using a QVBR algorithm for live streaming a live sporting event. Thus, VOD content may be encoded using a QVBR algorithm while also being delivered as a live event stream.

In some implementations, segments of VOD content may be encoded using different encoding profiles stored in encoding profiles 224. Some codecs may have numerous encoding parameters (e.g., 30-50), such as, for example, the Advanced Video Coding (AVC), High-Efficiency Video Coding (HEVC), and AOMedia Video 1 (AV1) codecs. Specifically, such codecs utilize encoding profiles having numerous encoding parameters, such as quantization parameters, block size parameters, adaptive encoding optimization parameters, and so forth, with each encoding parameter having either direct or indirect impact on encoding bit rate and quality. It should be noted, however, that the techniques described herein are agnostic to specific codec implementation, and may be employed to configure encoders implemented according to any of a wide variety video compression standards including, for example, Advanced Video Coding (AVC) or H.264, High Efficiency Video Coding (HEVC) or H.265, AV1, VP8, and VP9, as well as future standards, e.g., H.266.

A single encoding profile may not be well-suited for all content. For example, a particular value for an encoding parameter setting such as the quantization parameter may provide a high-quality encoding of content of a first category (e.g., concerts having relatively little motion). However, content of a second category (e.g., sports events having a relatively higher degree of motion) might not be encoded as well since the parameter settings for high quality encodings vary based on the characteristics of the content, including, but not limited to, levels of motion, spatial details, and encoding complexity. As another example, the default encoding ladder may be well-suited for providing a high-quality encoding of live-action content, but animated content might not be encoded as well since the encoder parameter settings for animated content may vary from live-action content. Therefore, if the default encoding profile is tailored to a first category or type of content, other categories or types of content may be encoded with sub-optimal quality and/or result in excessive bitrates.

Thus, in some embodiments VOD content may be encoded using different encoding profiles for different portions of the VOD content. In some implementations, multiple encoding profiles are available and optimized for encoding content based on properties of the portion of content to be encoded. For example, animated content can be determined by analyzing a video title and determining that it includes a certain threshold range or number of small blocks (e.g., small coding units (CUs) of an image frame corresponding to residual coefficients) having sharp areas, larger blocks having smoother areas but a level of detail below a threshold level of detail, etc. By contrast, live-action content might have more blurred edges rather than sharp edges, gradual colors rather than sudden color changes as in animation, etc. Based on the properties of the portion of content, an encoding profile may be selected that optimizes for, e.g., quality or bitrate.

Live playback logic 123 may handle routing of requests and delivery of live manifest and segments to client devices, e.g., client device 206. Traffic manager 251 may parse and route manifest and segment requests to playout engine logic 120 and resource management logic 122, respectively. CDN 114 may cache and deliver live manifests and segments to various client devices. Secondary content insertion 252 may insert secondary content based on ad placements in the live manifest or replace ad slates included in the live manifest. In some embodiments secondary content insertion 252 may insert or replace ad content based on cue points in the live manifest.

Figure 3:
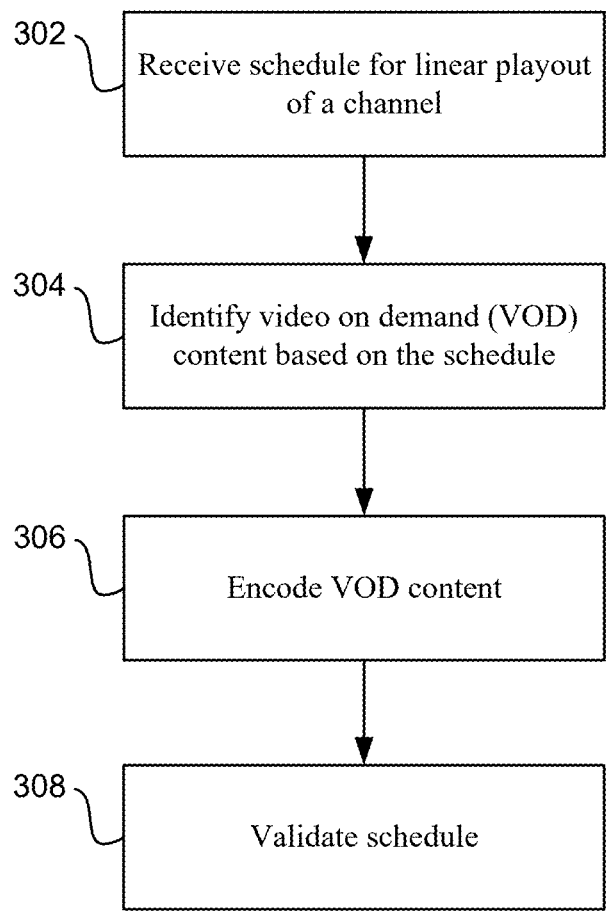
FIG. 3 presents a flowchart illustrating creation of a channel for linear playout.

FIG. 3 presents a flowchart for creation of a linear playout of a channel. A schedule is received (302). The schedule may be a schedule as discussed above, e.g., a continuous series of programs and secondary content placements. VOD content is identified based upon the schedule (304). In some implementations, VOD content may already be stored and available for streaming, while in other implementations VOD content is received for storage. The VOD content may be encoded (306). VOD content may be encoded as discussed herein, including encoding cue points, using a QVBR algorithm, and using different encoding profiles for different portions of VOD content. In some implementations, all segments representing VOD content may be stored as a single encoded file rather than individual segment files. It should be understood that multiple files may be necessary to represent VOD content based on different encodings of the VOD content. Thus, VOD content may be stored as a single file for a particular bitrate or bitrate limit, depending on the encoding algorithm used.

The schedule may also be validated (308). Validation may include determining there are no gaps or overlaps between scheduled programs. Validation may also include verifying the media presentation assets associated with the schedule have properties that match the properties specified in the schedule, including duration, encoding, cue points, etc. In some implementations, if a schedule is determined to be invalid, a notification is generated indicating the schedule must be updated. In some implementations the notification may include information describing why the schedule was determined to be invalid, e.g., a desired cue point for a program is not available.

In some embodiments, the schedule may be updated. Updating a schedule may include providing an updated schedule that identifies a series of programs and secondary content placements that may differ from the current schedule. The schedule may then be re-validated and any new VOD content may be re-encoded and packaged. In some embodiments, a schedule may loop. For example, if a schedule describes programs for a four-week duration, the schedule may repeat every four weeks until an updated schedule is provided or the channel is closed.

Figure 4:
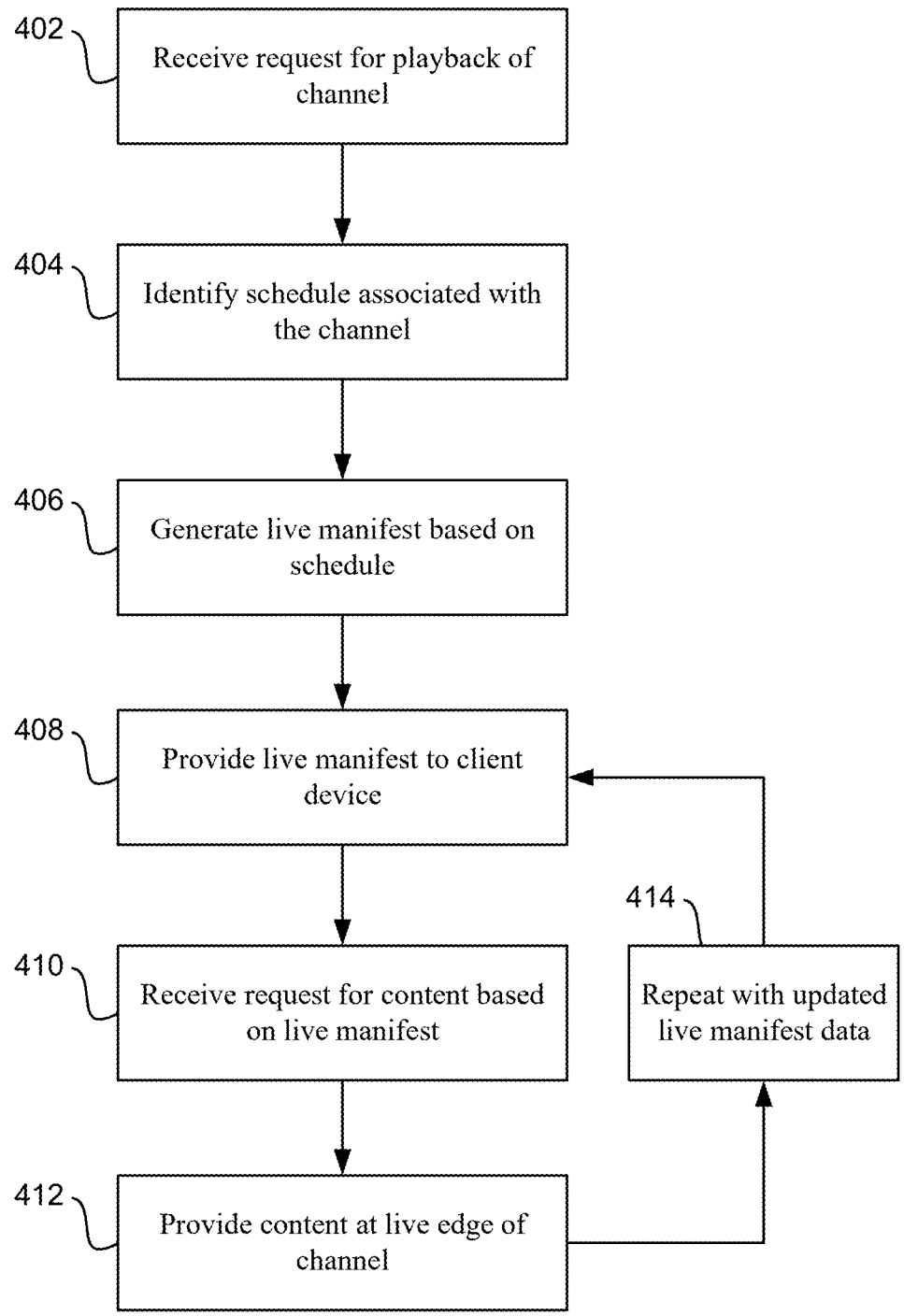
FIG. 4 presents a flowchart illustrating providing live manifests to a client device according to a linear playout.

Once the schedule is validated and the VOD content is identified or created, the channel may be made available for client devices. FIG. 4 presents a flowchart for a playback of a channel by a client device. A request for playback of a channel is received (402). The schedule associated with the channel is identified (404). In some implementations, a portion of a schedule corresponding to the current time is identified. The portion of the schedule may describe the content to provide to client devices for the current time, including a specific portion of the content to be provided.

A live manifest is generated based on the schedule (406). In some implementations, the live manifest includes timing metadata defining when a segment should be played back, including segments of VOD content. The timing metadata enables synchronized playback of content across client devices playing back the same channel. In some implementations, the live manifest includes references to VOD content, secondary content placements, live event content, or any combinations thereof.

A live manifest may include a live playhead, or live edge, that designates a portion of content as the most recent content to playback according to a schedule. In a live event stream, such as a sporting event, the live playhead would be the most recently encoded segment. In a linear playout live stream, the live playhead may also refer to a portion of VOD content that is most recently added to the live manifest or is intended to be played back based on an associated schedule. In some implementations, a live playhead may be defined as an offset from a start of a live event or start of VOD content, as defined by an associated schedule, and the current time.

In some implementations, a live manifest may include references to two-second segments of content. In some implementations, a live manifest may include references to longer segments, e.g., more than ten second segments or more than 30 second segments. While a ten second segment may be undesirable for live event streaming (as the next segment would necessarily lag the real time event by at least ten seconds), for VOD content there is not a real time latency concern, as the subsequent fragment is not encoded in real time relative to playback. Thus, longer segments may be used that allow for more efficient distribution of content.

In some embodiments, a live manifest may include byte-range references to VOD content. Byte-range references may be preferable as the underlying asset may be stored as a single file rather than individual segments, where the byte-range specifies a specific portion of that file as a segment to be provided. Thus, a VOD asset may be segmented as part of encoding, but each segment may be consolidated into a single file rather than storing individual files, i.e., 3600 individual files for a 2 hour movie having 2-second segments. Furthermore, as the byte-range indicates the size of the segment, a client device using an adaptive bitrate algorithm may determine the size of the segment and request higher or lower bitrate segments based on the size of the segment. In embodiments using a byte-range manifest a VOD asset may be stored as a single file having segments defined by byte-ranges.

In some implementations, a live manifest may include byte-range references and segment references. For example, an ad inserted mid-roll of VOD content may use segment references, while references to the VOD segments use byte-range references. Alternatively, live event content and VOD content may be stitched together in a live manifest, and the live event content may be encoded using segments that allow a client device to sequentially request segments as they are encoded in real time. During playback, a client may use byte-range references to request the VOD content, and as the schedule changes to the live event content the client may use segment references to request the live event content.

In some embodiments, a live manifest includes a subset of cue points for a VOD asset. As noted above, a VOD asset may be encoded and stored based on all cue points defined for the VOD asset across multiple schedules. A live manifest is generated according to a single schedule, and thus will only contain cue points that correspond to that schedule. While the VOD content may still be segmented based on all cue points, the live manifest may only include cue points that correspond to the schedule, and will not include all cue points available. For example, if a VOD asset is divided into two-second segments, a cue point may cause a segment to be divided into 1.1 and 0.9 second segments, with a cue point between the segments. A live manifest will reference both the 1.1 and 0.9 second segments, but may not include the cue point unless the corresponding schedule includes that cue point.

In some embodiments, a live manifest may include a discontinuity marker (for DASH) or similar marker between references to segments. A discontinuity marker may be used to indicate a change in content properties. For example, a sports analyst may discuss a live sporting event prior to the event. This type of content typically has little movement, and thus may be streamed at a low bitrate, e.g., 30 frames per second. The live sporting event, however, may have fast movement and thus a high bitrate is desirable, e.g., 50 or 60 fps. A discontinuity marker may be added to the manifest to enable a client device to switch between the different segment properties without interrupting playback or deteriorating the quality of experience for a viewer. Another example may be VOD content that is recorded at 24 or 30 fps that switches to a live event recorded at 50 or 60 fps. Including a discontinuity marker in a live manifest may allow a client device to seamlessly transition to playback of content having different properties. Properties that may change between programs may include frame rate, encoding profiles, video format (e.g., HDR10, HDR10+, Dolby Vision, SDR), audio format (e.g., Dolby Digital, Dolby Atmos), and resolution. In some implementations, references included in a manifest may be altered or filtered to align to a standard property. For example, if a schedule includes SDR and HDR content, either the SDR or HDR content needs to be altered to match the other, as a client device is typically unable to switch between SDR and HDR in a contiguous session. Alternatively, if SDR and HDR content is available but a prior program was streamed using SDR, then only references to SDR content may be included in the manifest.

The live manifest is provided to client devices (408), and a request for content based on the live manifest is received (410). Content at the live edge is provided (412). As the channel is a live stream and using a live manifest, the live manifest may include metadata defining a live head for the channel to synchronize content playback across channels. Furthermore, updated live manifest data may be provided to provide references for the next segment to be played back (414). While the live manifest may include additional future segments for VOD assets, this may enable a client device to request content ahead of the live head, thus breaking synchronization across different clients. Thus, a live manifest may not include reference information for portions of VOD content that are ahead of the live playhead, e.g., have a byte-range offset from the start of the VOD content greater than the live playhead. In some embodiments, timing information included in the manifest may define which segment should be played back, and trick modes such as fast forward may be disabled. In other embodiments, a live manifest may have references to content prior to the live playhead within a threshold range, e.g., within one hour of the live playhead. Using a live playhead for streaming VOD content causes synchronized playback of content. In some embodiments, a live manifest may have references to VOD content that may progress without needing to update a live manifest with each segment. In some embodiments, VOD content may be encoded with longer segments, e.g., segments greater than 10 seconds, such that fewer live manifest updates need to be provided as each segment is longer in duration.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A system, comprising:
   one or more processors; and
   one or more memories storing computer-executable instructions that, when executed by the one or more processors, configure the one or more processors for:
   receiving a plurality of schedules of linear playout corresponding to a plurality of channels;
   identifying video on demand (VOD) content and live event content to be included in a first channel of the plurality of channels based on the plurality of schedules, wherein the VOD content is encoded based on a set of cue points, wherein a schedule associated with the first channel comprises a subset of the set of cue points;
   receiving requests from a plurality of client devices to playback the first channel;
   providing to the plurality of client devices a first live manifest for the first channel, the first live manifest comprising references to the VOD content; and
   providing to the plurality of client devices an updated first live manifest comprising references to the VOD content and the live event content, wherein the live event content has one or more properties that are different from properties of the VOD content, wherein the properties comprise frame rate, encoding profiles, audio format, and resolution.

2. The system of claim 1, further comprising:
   providing the plurality of client devices first portions of the VOD content;
   providing additional client devices a second live manifest for a second channel, the second live manifest comprising references to the VOD content; and
   providing the additional client devices second portions of the VOD content, wherein the first portions of the VOD content and the second portions of the VOD content are generated by re-encrypting a VOD content asset using different encryption keys for the first portions and the second portions, the different encryption keys corresponding to the first channel and the second channel.

3. A system, comprising:
   one or more processors; and
   one or more memories storing computer-executable instructions that, when executed by the one or more processors, configure the one or more processors for:
   receiving a request for playback of a first channel from a first client device;
   identifying a first schedule of linear playout for the first channel;
   identifying a video on demand (VOD) content to be included in the first channel based on the first schedule, wherein the VOD content is encoded based on a set of cue points, wherein the first schedule comprises a first subset of the set of cue points;
   generating a first live manifest for the first channel based on the first schedule, the first live manifest comprising references to the VOD content;
   providing the first live manifest to the first client device;
   receiving a request for content at a live playhead of the live manifest; and
   providing a first portion of VOD content to the first client device based on the live playhead.

4. The system of claim 3, wherein the computer-executable instructions include additional instructions to configure the one or more processors for:
   receiving a request for playback of a second channel from a second client device;
   identifying a second schedule of linear playout for the second channel;
   identifying the video on demand (VOD) content to be included in the second channel based on the second schedule, wherein the second schedule comprises a second subset of the set of cue points that is different from the first subset of cue points;

generating a second live manifest for a second channel based on the second schedule, the second live manifest comprising references to the VOD content;

providing the second live manifest to the second client device;

receiving a request for a second portion of the VOD content from the second client device; and providing the second portion of the VOD content to the second client device.

5. The system of claim 4, wherein the computer-executable instructions include additional instructions to configure the one or more processors for:

packaging the VOD content; and re-encrypting the packaged VOD content for the first channel and the second channel, wherein the first portion of the VOD content and the second portion of the VOD content are encrypted using different encryption keys, wherein the different encryption keys are based upon the corresponding channel for the first portion of the VOD content and the second portion of the VOD content.

6. The system of claim 3, wherein the VOD content is encoded according to a Quality-Defined Variable Bitrate encoding profile.

7. The system of claim 3, wherein the first live manifest comprises byte-range references to the VOD content.

8. The system of claim 7, wherein the first live manifest additionally comprises references to segment files of the VOD content.

9. The system of claim 3, wherein a first segment of the VOD content is encoded using a first encoding profile, and a second segment of the VOD content is encoded using a second encoding profile.

10. The system of claim 3, wherein the computer-executable instructions include additional instructions to configure the one or more processors for generating an updated first live manifest and providing the updated first live manifest to client devices, the updated first live manifest having references to the VOD content and additional content, the additional content having one or more properties that are different from properties of the VOD content, wherein the updated first live manifest includes a discontinuity marker indicating the additional content has one or more properties that are different from properties of the VOD content.

11. A method, comprising:

receiving a request for playback of a first channel from a first client device;

identifying a first schedule of linear playout for the first channel;

identifying a video on demand (VOD) content to be included in the first channel based on the first schedule, wherein the VOD content is encoded based on a set of cue points, wherein the first schedule comprises a first subset of the set of cue points;

generating a first live manifest for the first channel based on the first schedule, the first live manifest comprising references to the VOD content;

providing the first live manifest to the first client device;

receiving a request for content at a live playhead of the live manifest; and providing a first portion of VOD content to the first client device based on the live playhead.

12. The method of claim 11, further comprising:

receiving a request for playback of a second channel from a second client device;

identifying a second schedule of linear playout for the second channel;

identifying the video on demand (VOD) content to be included in the second channel based on the second schedule, wherein the second schedule comprises a second subset of the set of cue points that is different from the first subset of cue points;

generating a second live manifest for a second channel based on a second schedule, the second live manifest comprising references to the VOD content;

providing the second live manifest to the second client device;

receiving a request for a second portion of the VOD content from the second client device; and providing the second portion of the VOD content to the second client device.

13. The method of claim 12, further comprising:

packaging the VOD content; and re-encrypting the packaged VOD content for the first channel and the second channel, wherein the first portion of the VOD content and the second portion of the VOD content are encrypted using different encryption keys, wherein the different encryption keys are based upon the corresponding channel for the first portion of the VOD content and the second portion of the VOD content.

14. The method of claim 11, wherein the VOD content is encoded according to a Quality-Defined Variable Bitrate encoding profile.

15. The method of claim 11, wherein the first live manifest comprises byte-range references to the VOD content.

16. The method of claim 15, wherein the first live manifest additionally comprises references to segment files of the VOD content.

17. The method of claim 11, wherein a first segment of the VOD content is encoded using a first encoding profile, and a second segment of the VOD content is encoded using a second encoding profile.

18. The method of claim 11, further comprising generating an updated first live manifest and providing the updated first live manifest to client devices, the updated first live manifest having references to the VOD content and additional content, the additional content having one or more properties that are different from properties of the VOD content, wherein the updated first live manifest includes a discontinuity marker indicating the additional content has one or more properties that are different from properties of the VOD content.

* * * * *